(12) United States Patent
Diekema et al.

(10) Patent No.: US 9,400,722 B2
(45) Date of Patent: Jul. 26, 2016

(54) METHOD OF PROVIDING HIGH INTEGRITY PROCESSING

(75) Inventors: Jon Marc Diekema, Jenison, MI (US); Bryan A. Theriault, Grand Rapids, MI (US); Kenneth Lewis Coviak, Ada, MI (US); Steven Edward Plante, Ada, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 1203 days.

(21) Appl. No.: 13/296,881

(22) Filed: Nov. 15, 2011

(65) Prior Publication Data
US 2013/0125137 A1    May 16, 2013

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 11/16 | (2006.01) | |

(52) U.S. Cl.
CPC ........ G06F 11/1683 (2013.01); G06F 11/1645 (2013.01)

(58) Field of Classification Search
CPC .................................................. G06F 11/1683
USPC ........................................................ 719/313
See application file for complete search history.

(56) References Cited

U.S. PATENT DOCUMENTS

| | | | |
|---|---|---|---|
| 4,393,501 A | 7/1983 | Kellogg et al. | |
| 5,964,835 A | 10/1999 | Fowler | |
| 6,526,490 B2 | 2/2003 | Davies et al. | |
| 7,987,385 B2 | 7/2011 | Pruiett et al. | |
| 2005/0240810 A1* | 10/2005 | Safford et al. | 714/10 |
| 2007/0162621 A1* | 7/2007 | Condorelli | G06F 11/1608 710/1 |
| 2009/0193229 A1 | 7/2009 | Aegerter | |
| 2010/0235847 A1* | 9/2010 | Brehmer et al. | 719/328 |
| 2010/0281239 A1 | 11/2010 | Sudhakar | |
| 2014/0025859 A1* | 1/2014 | Krause | 710/308 |

FOREIGN PATENT DOCUMENTS

| | | |
|---|---|---|
| CN | 1818882 A | 8/2006 |
| CN | 101702118 A | 5/2010 |

OTHER PUBLICATIONS

Search Report and Written Opinion from corresponding EP Application No. 12192319, dated Jul. 19, 2013.
Unofficial translation of CN Office Action issued on May 30, 2016 in connection with corresponding CN Application No. 201210455049.7.

* cited by examiner

*Primary Examiner* — Timothy A Mudrick
(74) *Attorney, Agent, or Firm* — GE Global Patent Operation; William S. Munnerlyn

(57) ABSTRACT

A method of providing high integrity communication in a high integrity processing system having at least two redundant application processors in a non-lockstep configuration where the redundant application processors are running the same application and where the redundant application processors are connected to at least one input/output processor by a communication channel.

19 Claims, 2 Drawing Sheets

METHOD OF PROVIDING HIGH INTEGRITY PROCESSING

BACKGROUND OF THE INVENTION

Computer processing modules may provide high integrity and high availability at the source to ensure that faults are detected and isolated with precision and that false alarms are minimized. High integrity modules are even more important for aircraft, whereby a fault that is not promptly and accurately detected and isolated may result in operational difficulties. Conventional designs for high integrity processing systems require expensive custom circuitry in order to implement instruction level lock-step processing between two or more microprocessors on the module. However, modern microprocessors do not have the capability of running in lockstep due to increased component integration and features that introduce variability in processing time.

BRIEF DESCRIPTION OF THE INVENTION

In one embodiment, a method of providing high integrity communication in a high integrity processing system having redundant application processors (APs) in a non-lockstep configuration running a same application, which are connected to at least one input/output processor (IOP) by a communication channel includes transferring a data message between the APs and the IOP via the communication channel, with the data message having a data field and providing a header in the data field having a source field containing a source data that uniquely identifies the source of the message, an integrity field containing integrity data indicative of a level of integrity of the data, and a command field containing command data for processing the message according to at least one of the source data and integrity data.

DESCRIPTION OF EMBODIMENTS OF THE INVENTION

High Integrity at the source computing currently requires at least two processing lanes running in lockstep at the instruction level, or two processing lanes and a monitor. If the software running on each processing lane of a module receives the same inputs (data, interrupts, time, etc.) and is able to perform the same "amount" of processing on the data before sending outputs or before receiving new inputs, then each lane will produce identical outputs in the absence of failures. In general, when the software running on a module receives inputs, the inputs must be identical on both lanes and both lanes must receive the inputs when they are in exactly the same state. When the software running on a module sends an output, the data from both lanes must be compared before it is output. In order to ensure that the output data comparison does not fail (because of improper state synchronization), the portions of the software responsible for producing the output data must reach the same state in both lanes before the outputs can be compared and then subsequently transmitted.

Modern microprocessor product lines do not support lock-step operation as they have in the past. This presents a problem for avionics manufacturers and others who require High Integrity systems, because error checking between redundant processors must now be handled external to the processor. It is also desirable to offload as many I/O operations as possible from the APs running flight critical applications to achieve performance improvements over previous technology. The embodiments of the invention provide methods for the APs' data to be synchronized during certain critical operations and provide a standard for communication between APs and I/O processors.

Figure 1:
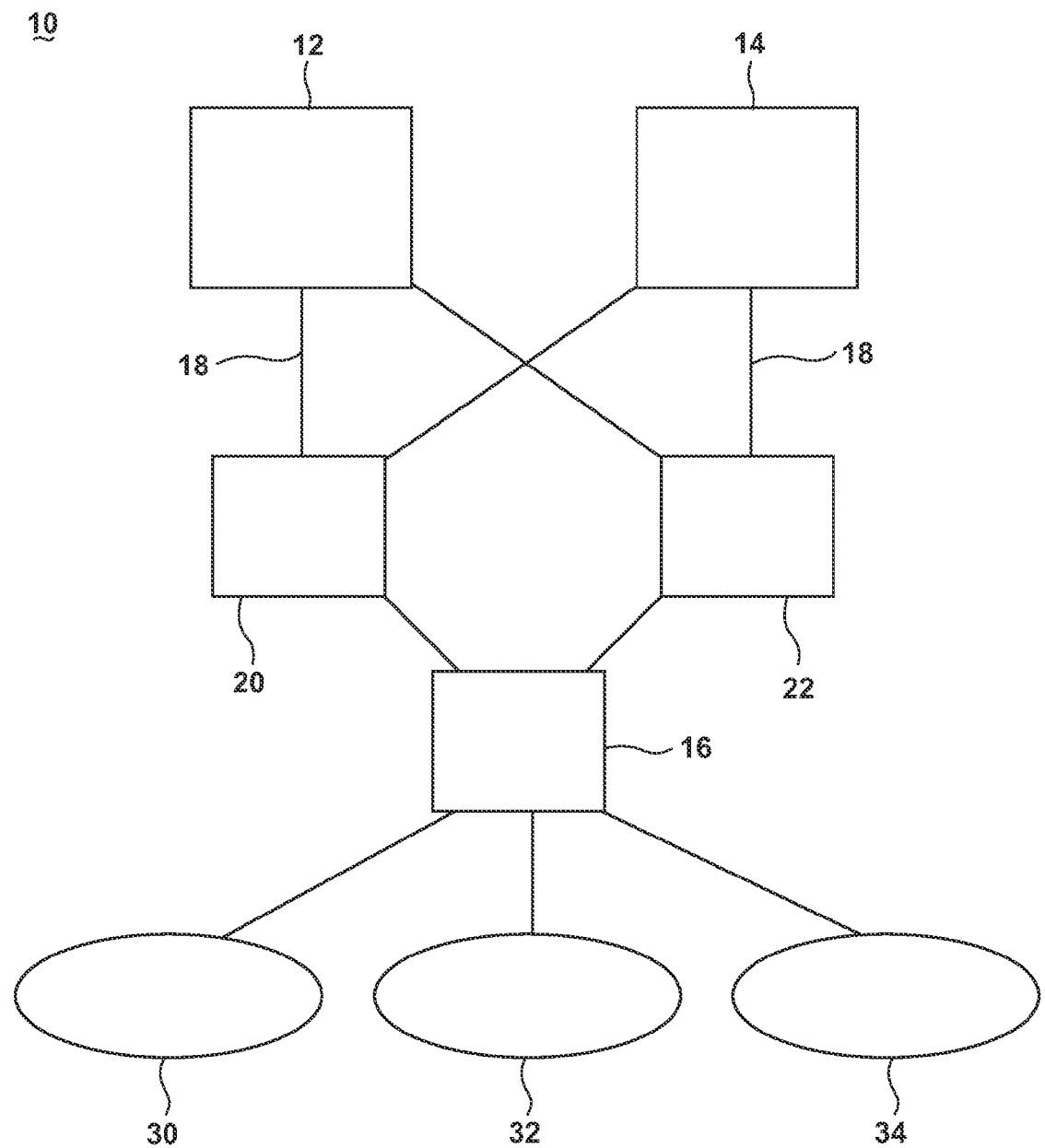
FIG. 1 is a schematic illustration of a high integrity processing system according to a first embodiment of the invention.
Figure 2:
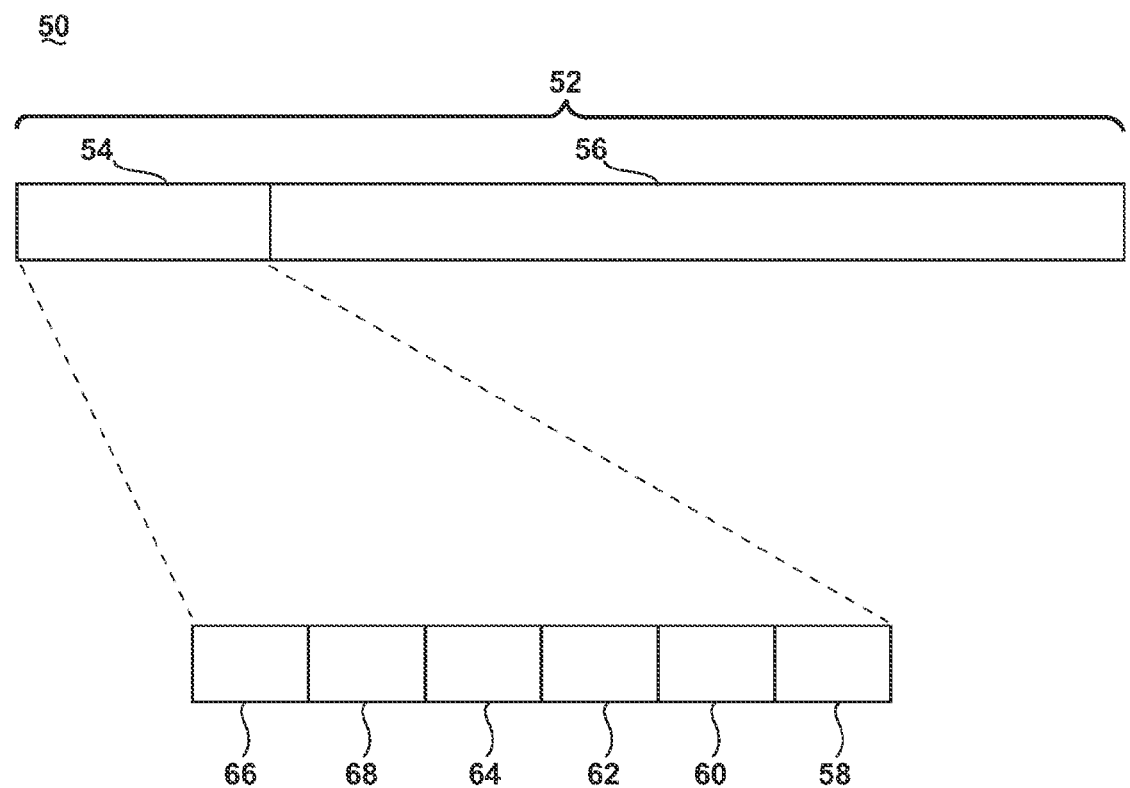
FIG. 2 is a schematic illustration of a data structure for a data field having a header according to an embodiment of the invention.

FIG. 1 illustrates a non-limiting example of a processing system 10 having a left AP 12 and a right AP 14 both of which are redundant with each other and are running the same application according to a first embodiment of the invention. The left and right APs 12 and 14 may be similar or dissimilar processors. It is contemplated that the processing system 10 may have more redundant processing lines but only two will be shown and described for clarity and ease of explanation. The left and right APs 12 and 14 are capable of operating in a non-lockstep configuration.

The left AP 12 and right AP 14 may be running a partitioned operating system and may transfer data to one or more IOPs 16 running multiple threads or partitions. By way of illustrative example only a single IOP 16 is illustrated as having three threads connected with various addressable spaces 30, 32, and 34. Such addressable spaces may include an Arinc664p7 end system, an I2C device, a serial device, an Ethernet device, or discretes. The threads may be used to transmit information to and/or receive information from such addressable spaces 30, 32, 34. Each form of communication may be supported by its own separate, uniquely identifiable thread on the IOP 16.

The left AP 12 and right AP 14 may be connected to the one or more IOPs 16 by a communication channel 18. The communication channel 18 may be a serial communication channel. In the illustrated embodiment, separate communication channels 18 allow the left AP 12 and the right AP 14 to communicate with the IOP 16.

A left field programmable gate array (FPGA) 20 may be located in the communication channel 18 between the left and right APs 12 and 14 and the IOP 16 such that data may be transferred through the FPGA 20. A right FPGA 22 may be located in the communication channel 18 between the left and right APs 12 and 14 and the IOP 16 such that data may be transferred through the right FPGA 22. It is contemplated that an Application Specific Integrated Circuit (ASIC) may be used instead of an FPGA. Each FPGA 20 and 22 may include a queue or buffer within which information may be stored. It is contemplated that a memory device including a non-volatile memory device may be communicably coupled to each of the FPGAs 20 and 22 and that data may be committed to the corresponding memory device from the FPGA.

The processing system 10 is capable of having efficient inter-processor communication and synchronizing the data between the left and right APs 12 and 14. According to one embodiment, a method of providing such high integrity communication includes transferring a data message 50 having a data field 52 between the left and right APs 12 and 14 and the IOP 16 via the communication channel 18 and providing a header 54 before the data 56 to be transferred within the data field 52. The header 54 may have a source field 58 containing source data, an integrity field 60 containing integrity data, and a command field 62 containing command data.

The source data may uniquely identify the source of the message. For example, the source data may include at least one of an AP identifier that uniquely identifies the AP from which the data message originated and an IOP identifier that uniquely identifies the IOP from which the data message originated. The AP identifier may also include a partition identifier when the AP is configured to run a partitioned operating system. The IOP identifier may also include a thread or partition identifier when the IOP is configured to run a threaded or partitioned operating system.

The integrity data may be indicative of the level of integrity of the data. By way of non-limiting example the integrity data may indicate that the data is at least one of Normal Integrity and High Integrity. Such integrity data may denote whether the information comes from both the left and right APs 12 and 14 in Normal Integrity, the left AP 12 in Normal Integrity, the right AP 14 in Normal Integrity, or High Integrity from the IOP 16 or FPGAs 20 and 22. The intent of the integrity field is to indicate the level of integrity the data has as it makes its way from one place to the next. For example, information traveling from an AP to the FPGA would be marked as Normal Integrity data, because it has not been cross-checked or synchronized with the same information from the other lane. If there is a synchronize command sent with this data, the level of integrity will change from Normal to High Integrity once the comparison between lanes has completed successfully. It is also contemplated that Normal Integrity data could be sent from an AP to the FPGA or through the FPGA down to the IOP where a transformation is performed on the data and the result returned only to the source partition on the source processor without ever synchronizing the data and therefore remains Normal Integrity throughout this process. It should be noted that data passed through the FPGA from the IOP 16 may be assumed to meet integrity requirements. All of the information that passes from an I/O device to the IOP and up to the FPGA is assumed to be High Integrity already, since the I/O devices providing this information will perform their own integrity checks before feeding it into the IOP.

The command data may be used for processing the message according to at least one of the source data and integrity data. In this manner, the command data allows for control over operations of the processing system 10, such as synchronizing data from the left and right APs 12 and 14 in the FPGA before passing the message to appropriate IOP threads, performing a calculation in the FPGA or IOP 16 and returning a result to the AP source partition, passing a message from an AP partition straight through the FPGA to an IOP thread, etc.

The header may also include a destination field 64 containing destination data for where the data message is to be sent. Such destination data may include at least one of an AP identifier that uniquely identifies a destination AP and an IOP identifier that uniquely identifies a destination IOP. As with the source data the destination data AP identifier may include a partition identifier when the AP is configured to run a partitioned operating system. Further, the IOP identifier may include a thread or partition identifier when the IOP is configured to execute multiple threads or partitions.

The header 54 may also include a sequence field 66 containing a sequence number. Such a sequence field 66 may be useful for detecting dropped messages. The header may also include a size field 68 containing information related to the data payload size in bytes.

During operation, the data message may be generated from a common message-passing API running on the left and right APs 12 and 14. By way of non-limiting example the common message-passing API may be MCAPI. MCAPI is an interface designed for embedded systems that allow communication at different system levels. The data field 52 of the data message may be encapsulated within a data field of a transport layer of a communication protocol for the communication channel 18.

The data message may be processed according to the command data while the message is in between the left and right APs 12 and 14 and the IOP 16. Processing the data message may include processing the data message in the FPGA located in the serial communication channel between the left and right APs 12 and 14 and the IOP 16. Processing logic may be executed on the FPGAs 20 and 22 to read the header and process the data message accordingly. The header information may ensure that the FPGA is comparing counterpart messages. In this manner, FPGA logic may be used to determine how the encapsulated data should be handled. More specifically, when the serial message is passed through the FPGAs 20 and 22, logic within the device will be able to perform the requested operations on the data payload and route the resulting data to the appropriate destination(s).

For example, processing the data message may include cross-checking data messages from the left and right APs 12 and 14 when the command data indicates cross-checking is required. For example, data that is passed from the APs 12 and 14 may be integrity checked in the case that high integrity operations are implemented. The determination of whether the module should operate as a High Integrity or Normal Integrity device will be determined through the use of synchronization commands in the header, which will be determined by the implementation of code in the AP. By way of non-limiting example, I/O read commands from the AP will not need synchronization whether the module is considered to be a High Integrity or Normal Integrity device, since the I/O devices always provide High Integrity data. If the module is to operate as a High Integrity device, I/O write commands from the AP will require synchronization, so the code running on the AP will set the synchronize command in the data header when a write operation needs to occur. If the module is to operate as a Normal Integrity device, I/O write commands from the AP will not require synchronization, so the code running on the AP will not set the synchronize command in the data header. It is important to note that there may be several types of synchronization commands, for instance, one that requires cross-checking data before passing it down to the IOP for output to an I/O device and another that cross-checks the data before committing it to a memory device connected with the FPGA. The FPGA may have a buffer such that data messages to be cross-checked may be stored within the buffer until the counterpart message from the redundant AP is generated.

The above described embodiments allow for a variety of benefits including that a standard for communication between master processors and I/O processors is provided. Further, the above described embodiments allow for the synchronization of modern processors without impacting performance. Further, data may be crosschecked and synchronized during certain critical operations, other non-critical operations may occur without the overhead of crosschecking, depending on what is commanded.

Further, because the control heading is built inside the data field of any serial protocol, the method may be portable to any application that requires I/O to be offloaded onto a separate processor, even if the serial protocol itself changes between products. For example, if PCIe is used for communicating between the APs and IOPs on one project, but Serial Rapid I/O protocol is used on a future project, the method would work for both. Further, in the case where MCAPI is used in developing the APIs for the processors' embedded software, there is a level of abstraction such that the functions underlying the API commands may vary from processor to processor, based on the capabilities of the hardware and the code that makes use of these APIs can remain unchanged from program to program, maximizing reusability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of communication fault detection in a high integrity processing system having redundant application processors in a non-lockstep configuration running a same application, which are connected to respective custom logic devices by a first communication channel and connected to at least one input/output processor by a second communication channel, the method comprising:

transferring a data message between the application processors and the respective custom logic devices via the first communication channel and transferring the data message between the at least one custom logic device and the at least one input/output processor via the second communication channel, wherein the data message includes a data field; and providing a header in the data field having a source field containing source data that uniquely identifies the source of the message as at least one of the redundant application processors or the input/output processor, an integrity field containing integrity data indicating whether the data has been cross-checked, and a command field containing command data for the at least one custom logic device to process-the message according to at least one of the source data or integrity data, wherein the processing comprises directly cross-checking the data messages from the redundant application processors when the command data includes an instruction for cross-checking.

2. The method of claim 1 wherein the integrity data comprises at least one of Normal Integrity data or High Integrity data, wherein Normal Integrity data has not been cross-checked and High Integrity data has been cross-checked.

3. The method of claim 2 wherein the source data comprises at least one of an application processor identifier that uniquely identifies the application processor from which the data message originated and an input/output processor identifier that uniquely identifies the input/output processor from which the data message originated.

4. The method of claim 3 wherein the application processor identifier further comprises a partition identifier when the application processor is configured to run a partitioned operating system.

5. The method of claim 3 wherein the header further comprises a destination field containing destination data for where the data message is to be sent.

6. The method of claim 5 wherein the destination data comprises at least one of an application processor identifier that uniquely identifies a destination application processor and an input/output processor identifier that uniquely identifies a destination input/output processor.

7. The method of claim 6 wherein the application processor identifier further comprises a partition identifier when the application processor is configured to run a partitioned operating system.

8. The method of claim 6 wherein the input/output processor identifier further comprises a thread identifier when the input/output processor is configured to execute multiple threads.

9. The method of claim 5 wherein the header further comprises a sequence field containing a sequence number.

10. The method of claim 2 wherein when the integrity data indicates Normal Integrity before the data message is cross-checked with counterpart messages from the redundant APs the integrity data is changed to High Integrity once successfully cross-checked.

11. The method of claim 1 wherein the data field of the data message is encapsulated within a data field of a transport layer of a communication protocol for the communication channel.

12. The method of claim 11 wherein the communication channel is a serial communication channel.

13. The method of claim 11, further comprising generating the data message from a common message-passing application program interface running on the application processors.

14. The method of claim 13 wherein the common message-passing application program interface is Multi core Communications Application Program Interface.

15. The method of claim 1 wherein at least one of the custom logic devices is comprised of a field-programmable gate array.

16. The system of claim 15 wherein the custom logic device is comprised of an field-programmable gate array.

17. The method of claim 1 where at least one of the custom logic devices is comprised of an application-specific integrated circuit.

18. The system of claim 17 wherein the custom logic device is comprised of an application-specific integrated circuit.

19. A system for high-integrity communication fault detection, comprising:

redundant first and second application processors in a non-lockstep configuration running a same application;

at least one custom logic device communicably connected to the first and second application processors via a first communication channel; wherein the at least one custom logic device receives a data message from the first or second application processors, wherein the data message provides a header containing a source field containing source data that uniquely identifies the source of the message as at least one of the redundant first and second application processors or an input/output processor, an integrity field containing integrity data indicating whether the data has been cross-checked, and a command field containing command data, wherein the at least one custom logic device will cross-check the data message when a cross-check command is included in the command field and the at least one custom logic device will change the integrity data from normal integrity to high integrity after a successful cross-check; and an input/output processor communicably connected to the at least one custom logic device via a second communication channel; wherein the input/output processor receives data messages from the at least one custom logic device with the integrity data field set as normal integrity when the data has not been cross-checked and high integrity when the data has been cross-checked.

* * * * *